United States Patent
Kim et al.

(10) Patent No.: US 8,594,443 B2
(45) Date of Patent: Nov. 26, 2013

(54) METHOD AND APPARATUS FOR MOTION COMPENSATION SUPPORTING MULTICODEC

(75) Inventors: Doo-hyun Kim, Seoul (KR); Hyun-sang Park, Cheonan-si (KR); Si-hwa Lee, Seoul (KR); Do-hyung Kim, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1522 days.

(21) Appl. No.: 11/936,295

(22) Filed: Nov. 7, 2007

(65) Prior Publication Data

US 2008/0219572 A1 Sep. 11, 2008

(30) Foreign Application Priority Data

Nov. 8, 2006 (KR) .................. 10-2006-0110224
Oct. 26, 2007 (KR) .................. 10-2007-0108448

(51) Int. Cl.
*G06K 9/36* (2006.01)
*G06K 9/46* (2006.01)

(52) U.S. Cl.
USPC .............. 382/236; 382/238; 375/240.12

(58) Field of Classification Search
USPC ........... 382/236, 238, 239, 300; 375/240.12, 375/240.17, 240.13–240.16
See application file for complete search history.

(56) References Cited

U.S. PATENT DOCUMENTS

| | | | | |
|---|---|---|---|---|
| 6,768,817 B1* | 7/2004 | Cheng et al. | | 382/232 |
| 6,950,469 B2* | 9/2005 | Karczewicz et al. | | 375/240.17 |
| 7,110,606 B2* | 9/2006 | Truong et al. | | 382/233 |
| 7,349,473 B2* | 3/2008 | Hallapuro et al. | | 375/240.12 |
| 7,379,501 B2* | 5/2008 | Lainema | | 375/240.29 |
| 2002/0090028 A1* | 7/2002 | Comer et al. | | 375/240.2 |
| 2003/0169931 A1* | 9/2003 | Lainema | | 382/236 |
| 2004/0062307 A1* | 4/2004 | Hallapuro et al. | | 375/240.13 |
| 2005/0013363 A1* | 1/2005 | Cho et al. | | 375/240.12 |

(Continued)

FOREIGN PATENT DOCUMENTS

| | | |
|---|---|---|
| CN | 1666429 A | 9/2005 |
| CN | 1835585 A | 9/2006 |

(Continued)

OTHER PUBLICATIONS

"Discussion for the Interpolation Process of the H.264 Standard", Chinese Doctoral Dissertations & Master's Thesis, Full-text Database(Master), Information Science and Technology, 2005.

(Continued)

*Primary Examiner* — Aaron W Carter
(74) *Attorney, Agent, or Firm* — Staas & Halsey LLP

(57) ABSTRACT

Provided are a method and apparatus for compensating motion of a moving image. The method includes calculating a pixel value of a pixel located between pixels of a reference image corresponding to a current image based on pixel values of the pixels of the reference image by using at least one method from among a plurality of methods, such as a vertical linear filtering, a horizontal linear filtering, and a cubic filtering, of interpolating the pixels of the reference image according to codec information indicating one of a plurality of codecs, such as MPEG4, H.264/AVC, and VC1, and restoring the current image by adding motion compensation data, including the calculated pixel value, and a difference between the reference image and the current image.

19 Claims, 13 Drawing Sheets

(56) References Cited

U.S. PATENT DOCUMENTS

| | | | |
|---|---|---|---|
| 2005/0018912 A1* | 1/2005 | Truong et al. | 382/232 |
| 2005/0259688 A1 | 11/2005 | Gordon | |
| 2005/0262276 A1 | 11/2005 | Singh et al. | |
| 2006/0133506 A1 | 6/2006 | Dang | |
| 2006/0294171 A1* | 12/2006 | Bossen et al. | 708/300 |
| 2007/0070080 A1* | 3/2007 | Graham et al. | 345/589 |
| 2007/0229534 A1* | 10/2007 | Kim et al. | 345/606 |
| 2008/0075165 A1* | 3/2008 | Ugur et al. | 375/240.12 |
| 2009/0022220 A1* | 1/2009 | Vatis et al. | 375/240.12 |

FOREIGN PATENT DOCUMENTS

| | | |
|---|---|---|
| JP | 07-123337 | 5/1995 |
| JP | 08-228353 | 9/1996 |
| JP | 11-266460 | 9/1999 |
| KR | 102000061566 A1 | 10/2000 |
| WO | 2004/006558 A2 | 1/2004 |

OTHER PUBLICATIONS

Chinese Office Action issued Jun. 8, 2010 in corresponding Chinese Patent Application 200710169242.3.

Japanese Office Action issued Jul. 24, 2012 in corresponding Japanese Patent Application No. 2007-290086.

D. Wu et al, "A Single-Issue DSP-based Multi-standard Media Processor for Mobile Platforms"; Dept. of Electrical Engineering; pp. 1-10.

SMPTE Standard VC-1 Compressed Video Bitstream Format and Decoding Process; Feb. 24, 2006, p. 159-164.

Japanese Office Action for 2007-290086 dated Jun. 11, 2013.

* cited by examiner

FIG. 1

| Codec | MPEG4 | | H.264/AVC | | VC1 | |
|---|---|---|---|---|---|---|
| Component | Luminance | Crominance | Liminance | Chrominance | Liminance | Chrominance |
| Filter Type | Cubic | Cubic | Linear | Cubic | Linear, Cubic | Linear, Cubic |
| Tab number | 4 | 4 | 6 | 4 | 4 | 4 |

FIG. 2B
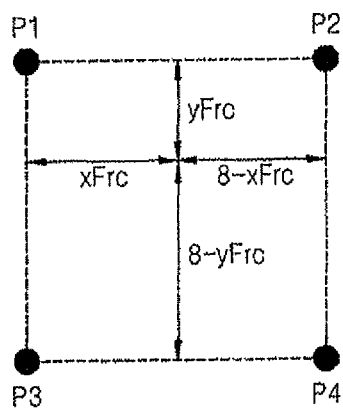
FIG. 2C

○ Integer pel
□ Half-pel in h-direction
◇ Half-pel in v-direction
● Quarter-pel

METHOD AND APPARATUS FOR MOTION COMPENSATION SUPPORTING MULTICODEC

CROSS-REFERENCE TO RELATED PATENT APPLICATION

This application claims the benefit of Korean Patent Application Nos. 10-2006-0110224, filed on Nov. 8, 2006, and 10-2007-0108448, filed on Oct. 26, 2007 in the Korean Intellectual Property Office, the disclosure of which is incorporated herein in its entirety by reference.

BACKGROUND OF THE INVENTION

1. Field of the Invention

The present invention relates to a method and apparatus for decoding a moving image, and more particularly, to a method and apparatus for motion compensation.

2. Description of the Related Art

A moving image decoding goes through several processes. Such processes largely include an entropy decoding, an inverse transform, inverse quantization, and motion compensation. Here, the motion compensation consumes the most processing time. According to the motion compensation, data about a part shared by a reference image and a current image is extracted from the reference image by referring to a motion vector, which shows a disparity between blocks of the current image and corresponding blocks of the reference image, and the current image is restored by adding the extracted data (hereinafter, referred to as motion compensation data) and data about a difference between the reference image and the current image (hereinafter, referred to as residue data). As described above, since the motion compensation should process massive amount of image data, a memory access amount and an operation amount are large. Since a throughput of the motion compensation is proportional to the size of an image, when the size of the image increases, the image may not be entirely processed within a required time, and thus a moving image may not be smoothly reproduced.

Most moving image codec engineers prefer realizing a moving image codec in software. This is because when a moving image codec is realized in software, a development period and expenses are reproduced and re-use of the moving image codec is easy compared to realizing the moving image in hardware. Specifically, flexibility of the moving image codec is high, and thus when an error occurs in the moving image codec, the software can easily correct the error. However, the core of the moving image codec is in a real-time process. Even if realizing the moving image codec in the software has various advantages, it is useless if the moving image codec cannot encode and decode an image in real-time. Meanwhile, when the moving image codec is realized in hardware, a development period and expenses increase, and flexibility is low. Accordingly, when the moving image codec needs to be amended, the entire structure of the moving image codec may be changed. However, when the moving image codec is realized in hardware, the moving image codec can be optimized to a target, and thus the speed of encoding and decoding a moving image can be rapidly increase compared to processing the moving image codec in software.

Due to different advantages and disadvantages of methods of realizing a moving image codec in hardware and software, most moving image codec engineers combine the two methods. That is, a module forming the moving image codec is divided into a part that is to be processed by software and a part that is to be processed by hardware according to characteristics of the parts. In this case, the motion compensation should be processed by hardware. In the motion compensation, not only massive data throughput is required, but also a memory access is far larger than other processes, and thus it is not suitable to process the motion compensation in software.

Recently, an important issue in realizing the moving image codec is to reproduce various moving image formats in one moving image player. Mostly used moving image formats include MPEG4, VC1, and H.264/AVC. However, when such three codecs are realized in one device and the motion compensation for each codec is realized, data throughput and memory access amount remarkably increase when the codecs are processed in software and the size of hardware and manufacture expenses increase when the codecs are processed in hardware.

SUMMARY OF THE INVENTION

The present invention provides an apparatus and method for motion compensation, which reduce data throughput and memory access, support multicodec for reducing the size and manufacture expenses of hardware while processing moving image reproduction in real-time, and reduce the size of a chip for motion compensation and manufacture expenses of the chip.

The present invention also provides a computer readable recording medium having recorded thereon a program for executing the method of above.

According to an aspect of the present invention, there is provided a method for motion compensation, including: (a) calculating a pixel value of a pixel located between pixels of a reference image corresponding to a current image based on pixel values of the pixels of the reference image by using at least one method from among a plurality of methods of interpolating the pixels of the reference image according to codec information indicating one of a plurality of codecs; and (b) restoring the current image by adding motion compensation data, including the calculated pixel value, and a difference between the reference image and the current image.

(a) may includes: (a1) selectively calculating a pixel value of a pixel located between pixels in a vertical line of a block of the reference image based on values of the pixels in the vertical line according to the codec information; (a2) selectively calculating a pixel value of a pixel located between pixels in a horizontal line of the block based on values of the pixels in the horizontal line according to the codec information; and (a3) selectively calculating a pixel value of a pixel located between pixels in a cubic of the block based on values of the pixels in the cubic according to the codec information.

According to another aspect of the present invention, there is provided a computer readable recording medium having recorded thereon a program for executing the method of above.

According to another aspect of the present invention, there is provided an apparatus for motion compensation, including: a motion compensation engine, which calculates a pixel value of a pixel located between pixels of a reference image corresponding to a current image based on pixel values of the pixels of the reference image by using at least one method from among a plurality of methods of interpolating the pixels of the reference image according to codec information indicating one of a plurality of codecs; and an adder, which restores the current image by adding motion compensation data, including the calculated pixel value, and a difference between the reference image and the current image.

The motion compensation engine may include: a vertical filter, which selectively calculates a pixel value of a pixel located between pixels in a vertical line of a block of the reference image based on values of the pixels in the vertical line according to the codec information; a horizontal filter, which selectively calculates a pixel value of a pixel located between pixels in a horizontal line of the block based on values of the pixels in the horizontal line according to the codec information; and a cubic filter, which selectively calculates a pixel value of a pixel located between pixels in a cubic of the block based on values of the pixels in the cubic according to the codec information.

BRIEF DESCRIPTION OF THE DRAWINGS

The above and other features and advantages of the present invention will become more apparent by describing in detail exemplary embodiments thereof with reference to the attached drawings in which:

FIG. 1 is a table illustrating characteristics of filters for motion compensation used in a plurality of moving image compression codecs;

FIG. 2B is a diagram illustrating a pixel interpolation of chrominance components according to H.264/AVC;

FIG. 2C is a diagram illustrating a pixel interpolation using a linear filter according to VC1;

DETAILED DESCRIPTION OF THE INVENTION

Hereinafter, the present invention will be described more fully with reference to the accompanying drawings, in which exemplary embodiments of the invention are shown.

FIG. 1 is a table illustrating characteristics of filters for motion compensation used in a plurality of moving image compression codecs. In order to restore a high resolution image, a motion vector of current moving image compression codecs does not only indicate pixels in a reference image, i.e. integer-pels, but also indicates half-pels located in half of between the integer-pels or quarter-pels located in quarter of between the integer-pels. However, since the half-pels and the quarter-pels are pixels that do not exist in the reference image, pixel values of the half-pels and the quarter-pels are generated by using a pixel interpolation method. FIG. 1 is a table illustrating characteristics of filters used in such a pixel interpolation method according to moving image compression codecs.

Referring to FIG. 1, chrominance components of MPEG4, H.264/AVC, and VC1 use a cubic filter, while the chrominance components of VC1 uses a linear filter as well. Also, MPEG4 uses a cubic filter for luminance components, H.264/AVC uses a linear filter for luminance components, and VC1 uses a cubic filter and a linear filter together for luminance components. Pixel interpolations according to MPEG4, H.264/AVC, and VC1 will now be described with reference to FIGS. 2A through 2E.

Figure 2A:
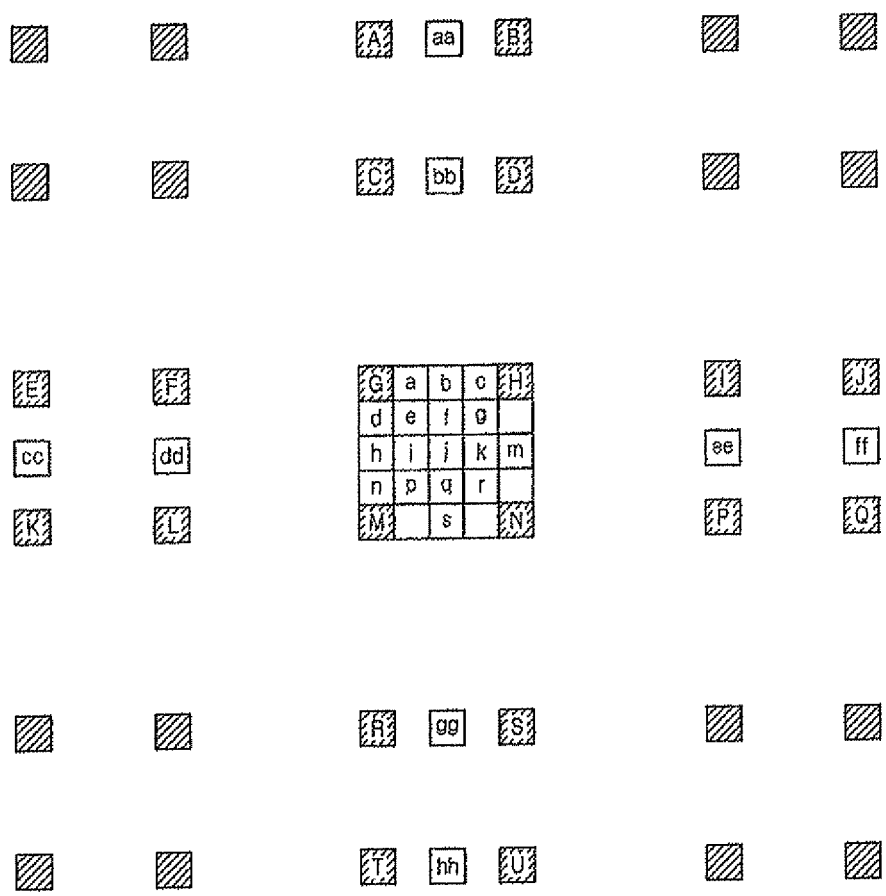
FIG. 2A is a diagram illustrating a pixel interpolation of luminance components according to H.264/AVC.

FIG. 2A is a diagram illustrating a pixel interpolation of luminance components according to H.264/AVC.

In FIG. 2A, capital letters indicate integer-pels and small letters indicate sub-pixels. An integer pixel denotes an original pixel used in a pixel interpolation, and a sub-pixel denotes a pixel, which has a pixel value generated by a pixel interpolation using an integer-pel, such as a half-pel or a quarter-pel. Referring to FIG. 2A, the pixel interpolation of luminance components according to H.264/AVC is performed up to a quarter-pel unit. First, half-pels illustrated in FIG. 2A, i.e. pixels in locations b, h, m, and s can be calculated by using a 6-tap filter, which has 6 coefficients according to Equation 1 below.

$$b1=(E-5*F+20*G+20*H-5*I+J)$$

$$h1=(A-5*C+20*G+20*M-5*R+T)$$

$$b=\text{Clip1}Y((b1+16)>>5)$$

$$h=\text{Clip1}Y((h1+16)>>5)$$

$$j1=cc-5*dd+20*h1+20*m1-5*ee+ff, \text{ or}$$

$$j1=aa-5*bb+20*b1+20*s1-5*gg+hh$$

$$j=\text{Clip1}Y((j1+512)>>10)$$

$$s=\text{Clip1}Y((s1+16)>>5)$$

$$m=\text{Clip1}Y((m1+16)>>5) \qquad [\text{Equation 1}]$$

Then, quarter-pels illustrated in FIG. 2A, i.e. the remaining pixels, can be calculated by using an average filter according to Equation 2 below. The average filter is a type of a 2-tap filter, which has 2 coefficients.

$$a=(G+b+1)>>1$$

$$c=(H+b+1)>>1$$

$$d=(G+h+1)>>1$$

$$n=(M+h+1)>>1$$

$$f=(b+j+1)>>1$$

$$i=(h+j+1)>>1$$

$$k=(j+m+1)>>1$$

$$q=(j+s+1)>>1$$

$$e=(b+h+1)>>1$$

$$g=(b+m+1)>>1$$

$$p=(h+s+1)\gg 1$$

$$r=(m+s+1)\gg 1 \quad \text{[Equation 2]}$$

In Equations 1 and 2, ">>" denotes a right shift operation, a number after ">>" denotes the number of bits shifted. For example, ">>1" denotes a 1 bit shift, and is equal to division by 2.

FIG. 2B is a diagram illustrating a pixel interpolation of chrominance components according to H.264/AVC.

P1, P2, P3, and P4 illustrated in FIG. 2B denote integer-pels, and convergence points of four arrows denote sub-pixels. Referring to FIG. 2B, the pixel interpolation of chrominance components according to H.264/AVC is performed in a predetermined location instead of a fixed location. In other words, a pixel in the predetermined location illustrated in FIG. 2B can be calculated by using a cubic filter according to Equation 3 below. The cubic filter is a type of a 4-tap filter having 4 coefficients.

$$P=((8-xFrc)*(8-yFrc)*P1+xFrc*(8-yFrc)*P2+(8-xFrc)*yFrc*P3+xFrc*yFrc*P4+32)\gg 6 \quad \text{[Equation 3]}$$

In Equation 3, "*" denotes a multiplication operation.

FIG. 2C is a diagram illustrating a pixel interpolation using a linear filter according to VC1.

P1, P2, P3, and P4 illustrated in FIG. 2C denote integer-pels, and points located between P2 and P3 denote sub-pixels. Referring to FIG. 2C, the pixel completion using the linear filter according to VC1 is performed up to a quarter-pel unit. In other words, a half-pel and quarter-pels corresponding to the points can be calculated using a cubic filter according to Equation 5 below.

$$P=(a*P1+b*P2+c*P3+d*P4+rc)\gg s \quad \text{[Equation 5]}$$

In Equation 5, "a", "b", "c", and "d" respectively denote coefficients of 4 taps, and are determined according to a location of a sub-pixel. "s" is also determined according to a location of a sub-pixel.

Figure 2D:
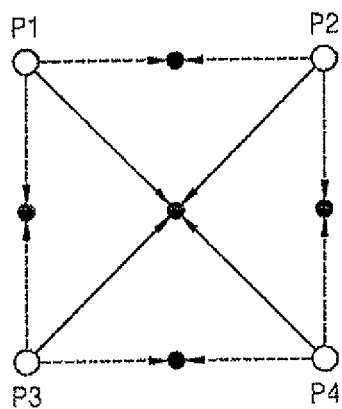
FIG. 2D is a diagram illustrating a pixel interpolation according to MPEG4.

FIG. 2D is a diagram illustrating a pixel interpolation according to MPEG4.

P1, P2, P3, and P4 illustrated in FIG. 2D denote integer-pels, and black points located between the integer-pels denote sub-pixels. Referring to FIG. 2D, the pixel interpolation of luminance components and chrominance components according to MPEG4 is performed up to a half-pel unit. For example, when a location of P1 is dx=0, dy=0, the half-pels corresponding to the black points can be calculated using a cubic filter according to Equation 4 below.

$$dx=1, dy=0: P=(P1+P2+1-rc)\gg 1$$

$$dx=0, dy=1: P=(P1+P3+1-rc)\gg 1$$

$$dx=1, dy=1: P=(P1+P2+P3+P4-rc)\gg 1 \quad \text{[Equation 4]}$$

In Equation 4, "rc" denotes rounding control, and is 0 or 1.

Figure 2E:
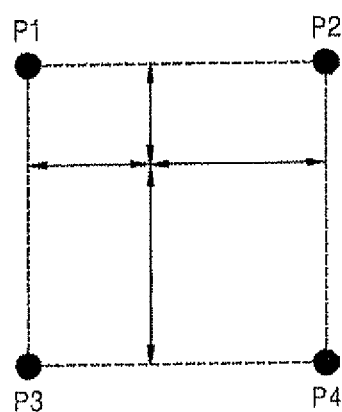
FIG. 2E is a diagram illustrating a pixel interpolation using a cubic filter according to VC1.

FIG. 2E is a diagram illustrating a pixel interpolation using a cubic filter according to VC1.

P1, P2, P3, and P4 denote integer-pels, and convergence points of four arrows denote sub-pixels. Referring to FIG. 2E, the pixel interpolation of chrominance components according to VC1 is performed on a predetermined location instead of a fixed location. A pixel in the predetermined location illustrated in FIG. 2E can be calculated using a cubic filter according to Equation 6.

$$P=(a*P1+b*P2+c*P3+d*P4+rc)\gg s \quad \text{[Equation 6]}$$

In Equation 6, "a", "b", "c", and "d" respectively denote coefficients of 4 taps, and are determined according to a location of a sub-pixel. "s" is also determined according to a location of a sub-pixel.

As described above, although the number of taps and the coefficient values are different in the filters used in MPEG4, H.254/AVC, and VC1, the coefficient values can be adjusted, and the number of taps can also be adjusted by zeroing coefficient values of some taps. For example, from among 6 taps forming a 6-tap filter, coefficient values of 2 taps can be zeroed, and thus the 6-tap filter can be used as a 4-tap filter. Also, by zeroing coefficient values of 2 taps from among 4 taps forming a 4-tap filter, the 4-tap filter can be used as a 2-tap filter, i.e. an average filter. Accordingly, it can be seen that there are some portions that can be shared by each filters used in MPEG4, H.264/AVC, and VC1. Using the portions, the three codecs can efficiently perform the motion compensation by using smaller number of filters.

From among the three codecs, H.264/AVC complements the pixels in the most complex way. However, since H.264/AVC uses a 6-tap filter in a linear filtering method for luminance components and a 4-tap filter in a cubic filtering method for chrominance components, they can be used as a 4-tap filter in a cubic filtering method of MPEG4 and VC1 and a 4-tap filter in a linear filtering method of VC1. Accordingly, the pixel interpolations of MPEG4 and VC1 are subsets of the pixel interpolation of H.264/AVC.

In other words, the linear filter having 6 taps can be used as a linear filter of MPEG4, a linear filter of H.264/AVC, and a linear filter of VC1 by adjusting coefficient values of the 6 taps. Also, the cubic filter having 4 taps can be used as a cubic filter of MPEG4, a cubic filter of H.264/AVC, and a cubic filter of VC1 by adjusting coefficient values of the 4 taps. However, the pixel interpolation of the luminance components according to H.264/AVC requires an average filtering method according to Equation 2.

Adjacent pixels used in the pixel interpolation are difference according to locations of each of the quarter-pels calculated according to Equation 2. For example, pixel values of pixels in locations e, g, p, and r are calculated by using pixel values of pixels in a diamond location having each of the pixels in locations e, g, p, and r as the center, and pixel values of pixels in locations f, i, k, and g are calculated by using pixel values of pixels in a cross location having each of the pixels in locations f, i, k, and g as the center. As described above, the process of a quarter-pel interpolation according to H.264/AVC is a complicated filtering method according to locations of the pixels, and thus it is not easy to be processed in hardware.

Figure 3:
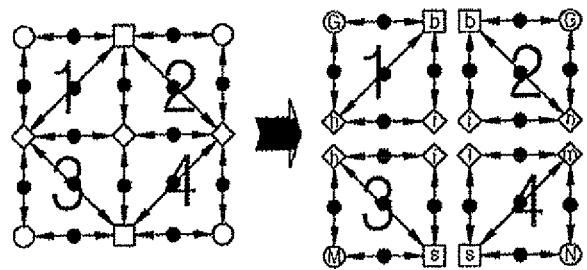
FIG. 3 is a diagram illustrating a cubic filter according to an embodiment of the present invention.

FIG. 3 is a diagram illustrating a cubic filter according to an embodiment of the present invention.

The process of a quarter-pel interpolation according to H.264/AVC is applied to the cubic filter illustrated in FIG. 3. Using the cubic filter of FIG. 3, the process of a quarter-pel interpolation according to H.264/AVC can be performed through a common module, such as the cubic filter.

Generally, the cubic filter calculates pixel values of half-pels, which are located in the center of each side of a cubic and in the center of the cubic, by using pixel values of integer-pels located in each vertex of the cubic. In the current embodiment, calculations corresponding to Equation 2 are performed by using characteristics of such a cubic filter. For example, a pixel value of a quarter-pel in a location a can be calculated by applying a pixel value of an integer-pel in a location G and a pixel value of a half-pel in a location b on the cubic filter of FIG. 3. It can be easily understood by one of ordinary skill in the art that a pixel value of a quarter-pel in another location can also be calculated as illustrated in FIG. 3.

Figure 4:
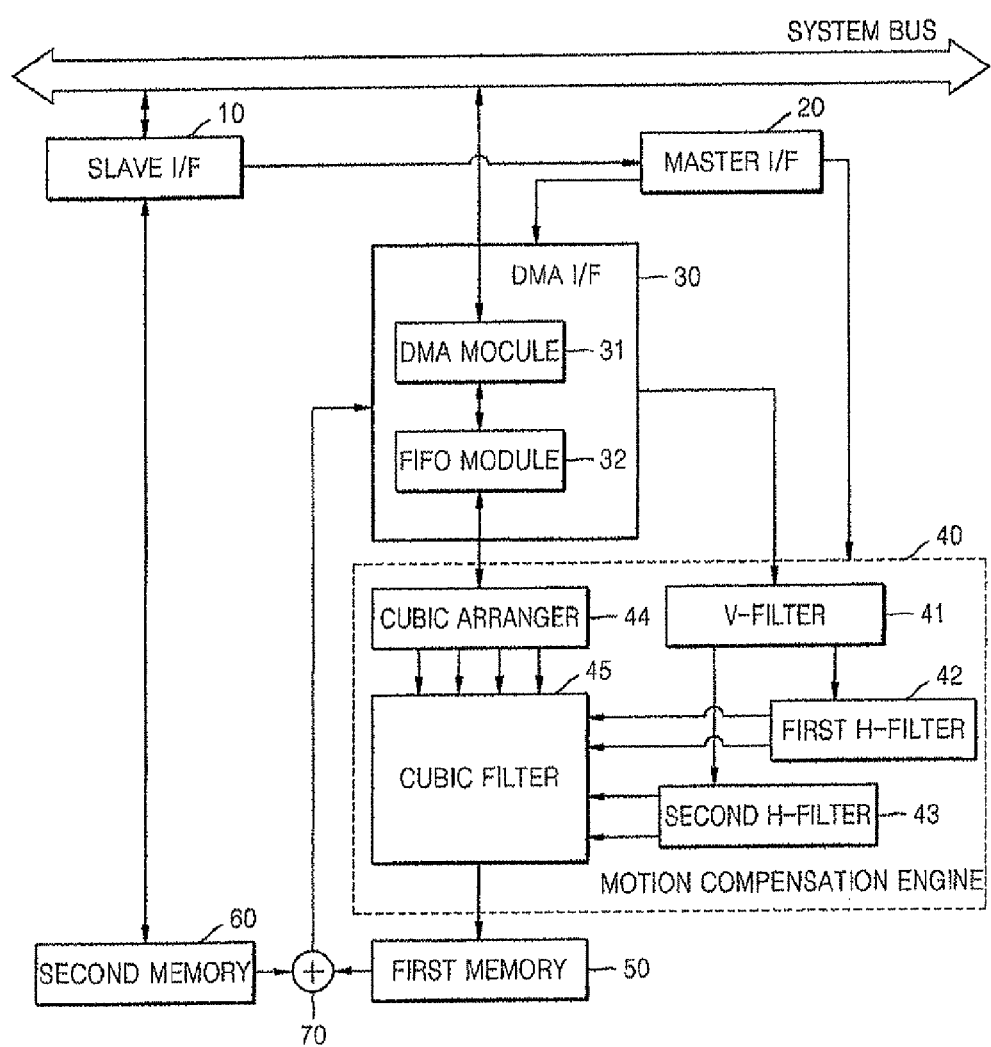
FIG. 4 is a diagram illustrating an apparatus for motion compensation supporting multicodec according to an embodiment of the present invention.

FIG. 4 is a diagram illustrating an apparatus for motion compensation supporting multicodec according to an embodiment of the present invention.

Referring to FIG. 4, the apparatus includes a slave interface 10, a master interface 20, a direct memory access (DMA) interface 30, a motion compensation engine 40, a first memory 50, a second memory 60, and an adder 70.

The slave interface 10 fetches residue data, which is transmitted from an external moving image encoding apparatus (not shown) through a system bus of a moving image decoding apparatus (not shown) including the apparatus according to the current embodiment, and outputs the fetched residue data to the second memory 60. Also, the slave interface 10 fetches motion compensation (MC) parameters, which are parameters required in motion compensation from the external moving image encoding apparatus through the system bus, and outputs the fetched MC parameters to the master interface 20.

The master interface 20 interprets the MC parameters received from the slave interface 10, selects MC parameters based on the result of interpretation, and outputs the selected MC parameters to the DMA interface 30 and the motion compensation engine 40. Accordingly, the master interface 20 can control operations of a MDA module 31 and a first-in first-out (FIFO) module 32, which form the DMA interface 30, and operations of a vertical filter 41, a first horizontal filter 42, a second horizontal filter 43, a cubic arranger 44, and a cubic filter 45, which form the motion compensation engine 40.

The first memory 50 stores motion compensation data generated by the motion compensation engine 40 and the second memory 60 stores the residue data received from the slave interface 10. Generally, the first and second memories 50 and 60 can be realized in a static random access memory (SRAM). The adder 70 restores a current image by adding the motion compensation data in the first memory 50 and the residue data in the second memory 60, and outputs data about the restored current image to the DMA interface 30.

The DMA interface 30 includes the DMA module 31 and the FIFO module 32. The DMA module 31 fetches data in a 32-bit unit of a reference image shared by the reference image and the current image from an external memory (not shown) through the system bus by referring to a motion vector, which indicates a disparity between blocks of the current image and the corresponding blocks of the reference image, from among the MC parameters received from the master interface 20, and stores the current image restored by the adder 70 in the external memory.

The FIFO module 32 extracts the data in a 32-bit unit fetched by the DMA module 31 in an 8-bit unit, and sequentially outputs the data in 8-bit units to the motion compensation engine 40. Specifically, besides the 8-bit unpacking of above, which outputs data only required for actual motion compensation to the motion compensation engine 40, the FIFO module 32 also performs padding according to a motion vector when data indicated by the motion vector does not exist in the reference image.

The motion compensation engine 40 performs motion compensation on the data in 8-bit unit received from the DMA interface 30. In detail, the motion compensation engine 40 calculates a pixel value of a pixel located between pixels of the reference image based on pixel values of the pixels of the reference image by using at least one method of interpolating the pixels of the reference image corresponding to the current image from among a vertical linear filtering method, a horizontal linear filtering method, and a cubic filtering method, according to codec information, which indicates any one of a plurality of codecs, color information, which indicates any one of a plurality of color components, and filter information, which indicates any one of a plurality of filters, from among MC parameters received from the master interface 20.

Referring to FIG. 4, the motion compensation engine includes the vertical filter 41, the first horizontal filter 42, the second horizontal filter 43, the cubic arranger 44, and the cubic filter 45.

The vertical filter 41 selectively calculates a pixel value of a half-pel located between integer-pels in a vertical line of a block of the reference image received from the DMA interface 30 based on pixel values of the integer-pels in the vertical line according to the codec information, the color information, and the filter information from among MC parameters received from the master interface 20. Specifically, the vertical filter 41 is realized in a linear filter having 6 taps, and calculates a pixel value of a half-pel indicated by a motion vector of the block from among the MC parameters received from the master interface 20 by applying the pixel values of the integer-pels in the vertical line on the 6 taps.

The first horizontal filter 42 selectively calculates a pixel value of a half-pel located between integer-pels in a horizontal line of a block of the reference image received from the DMA interface 30 based on pixel values of the integer-pels in the horizontal line according to the codec information, color information, and filter information from among MC parameters received from the master interface 20. Specifically, the first horizontal filter 42 is realized in a linear filter having 6 taps, and calculates a pixel value of a half-pel indicated by a motion vector of the block from among the MC parameters received from the master interface 20 by applying the pixel values of the integer-pels in the horizontal line on the 6 taps.

The second horizontal filter 43 selectively calculates a pixel value of a half-pel located between integer-pels in another horizontal line, which is different from the horizontal line processed by the first horizontal filter 42, based on pixel values of the integer-pels in the another horizontal line or pixel values of half-pels according to the codec information, the color information, and the filter information from among the MC parameters received from the master interface 20. Here, the half-pel can be calculated from adjacent integer-pels. Specifically, the second horizontal filter 43 is realized in a linear filter having 6 taps, and calculates a pixel value of a half-pel indicated by a motion vector of the block form among the MC parameters received from the master interface 20 by applying the pixel values of the integer-pels or the half-pels on the another horizontal line on the 6 taps.

The cubic arranger 44 selectively arranges the pixel values of the integer-pels or the half-pels received from the DMA interface 30 on a cubic location required to generate a pixel value of a half-pel, a quarter-pel, or a pixel in a predetermined location indicated by the motion vector of the block according to the codec information, the color information, and the filter information from among the MC parameters received from the master interface 20.

The cubic filter 45 selectively calculates a pixel value of a half-pel, a quarter-pel, or a pixel in a predetermined location between 4 integer-pels arranged by the cubic arranger 44 as illustrated in FIG. 3 based on pixel values of the 4 integer-pels according to the codec information, the color information, and the filter information from among the MC parameters received from the master interface 20. Also, the cubic filter 45 selectively calculates a pixel value of a half-pel or a quarter-pel between two integer-pels or half-pels located in a cubic of a block in a luminance component received from the first horizontal filter 42 or the second horizontal filter 43 based on pixel values of the two integer-pels or half-pels according to the codec information, the color information, and the filter information from among the MC parameters received from the master interface 20. Specifically, the cubic filter is realized in a cubic filter having 4 taps, and calculates a pixel value of a half-pel, a quarter-pel or a pixel in a predetermined location indicated by a motion vector of the block from among the MC parameters received form the master interface 20 by applying the pixel values of the two or four pixels in the cubic location on the two taps or four taps in the corresponding cubic location.

Each of the vertical filter 41, the first horizontal filter 42, the second horizontal filter 43, the cubic arranger 44, and the cubic filter 45 operates not according to all pixels but according to a value of a motion vector. When a motion vector from among the MC parameters received from the master interface 20 indicates a location of an integer-pel, motion between the reference image and a prediction image is an exact multiple of an interval between integer-pels. Accordingly, pixel values of integer-pels forming the reference image are pixel values of pixels forming the prediction image, and thus the vertical filter 41, the first horizontal filter 42, the second horizontal filter 42, the cubic arranger 44, and the cubic filter 45 do not need to interpolate pixel values. However, when a motion vector from among the MC parameters received from the master interface 20 indicates a location of a half-pel or a quarter-pel, motion between a reference image and a prediction image is not an exact multiple of an interval between integer-pels. Accordingly, values interpolated using pixel values of integer-pels forming the reference image are pixel values of pixels forming the prediction image, and thus the vertical filter 41, the first horizontal filter 42, the second horizontal filter 43, the cubic arranger 44, and the cubic filter 45 need to interpolate pixel values.

When the vertical filter 41, the first horizontal filter 42, the second horizontal filter 43, the cubic arranger 44, and the cubic filter 45 interpolate pixel values of the entire reference image, pixel values of integer-pels, which passed through without being processed by the vertical filter 41, the first horizontal filter 42, the second horizontal filter 43, and the cubic filter 45, a pixel value of a half-pel, a pixel value of a quarter-pel, and a pixel value of a pixel in a predetermined location calculated by the vertical filter 41, the first horizontal filter 42, the second horizontal filter 43, and the cubic filter 45 are completed as motion compensation data of the current image corresponding to the reference image.

Figure 5:
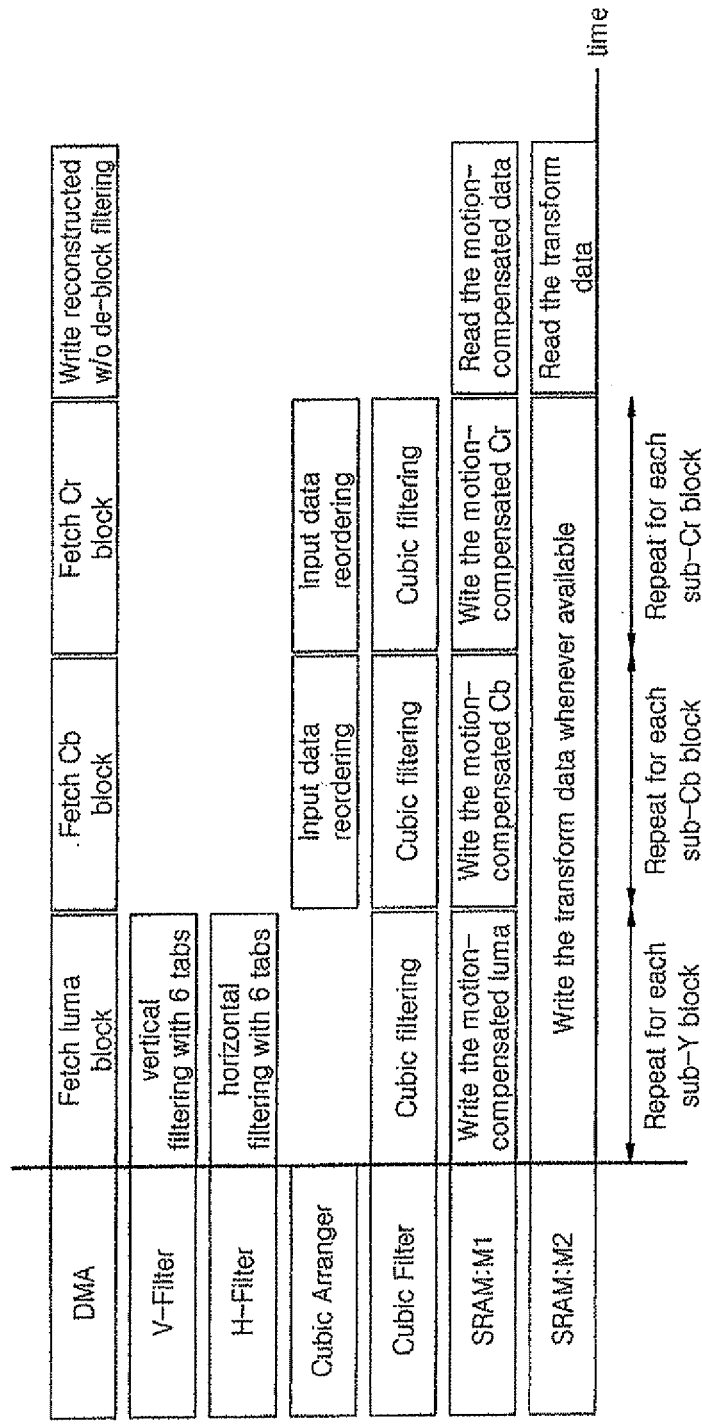
FIG. 5 is a diagram illustrating an operation scenario of a linear filter and cubic filter according to H.264/AVC in the apparatus illustrated in FIG. 4.
Figure 6:
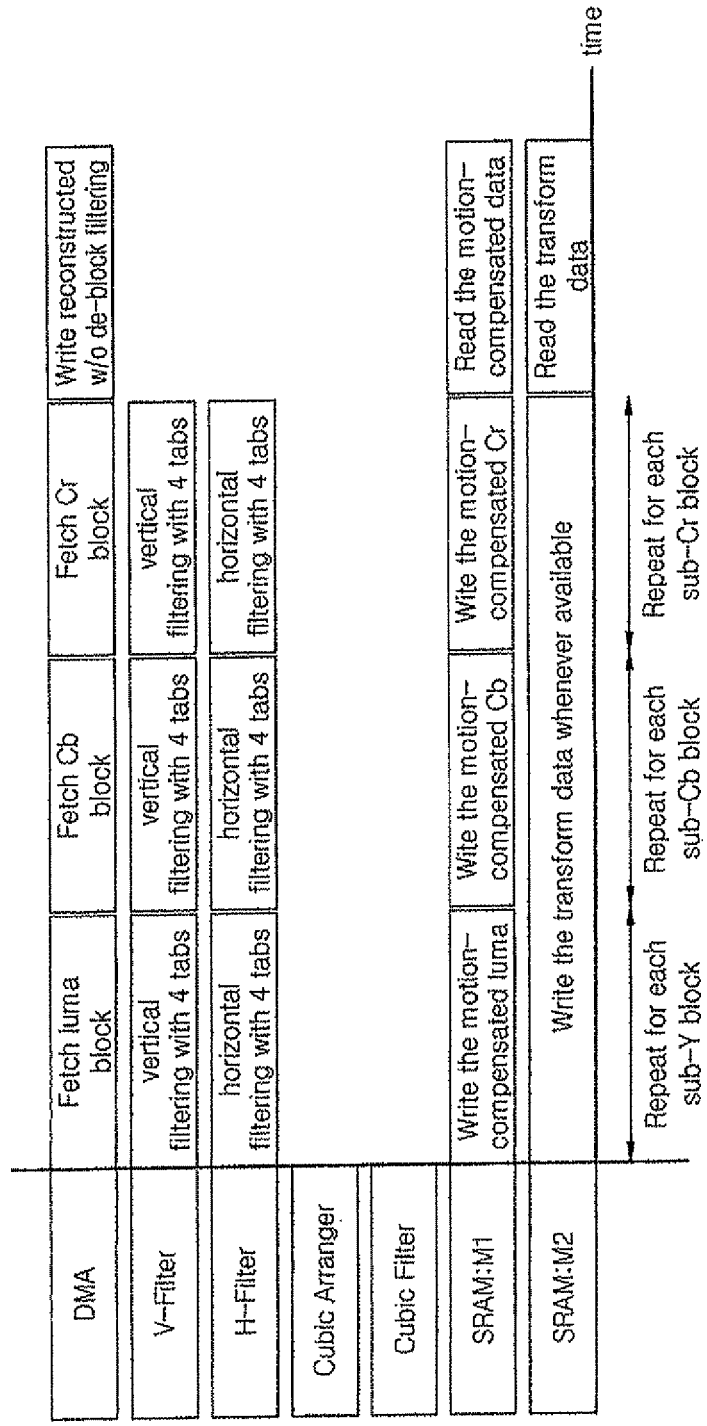
FIG. 6 is a diagram illustrating an operation scenario of a linear filter according to VC1 in the apparatus illustrated in FIG. 4.
Figure 7:
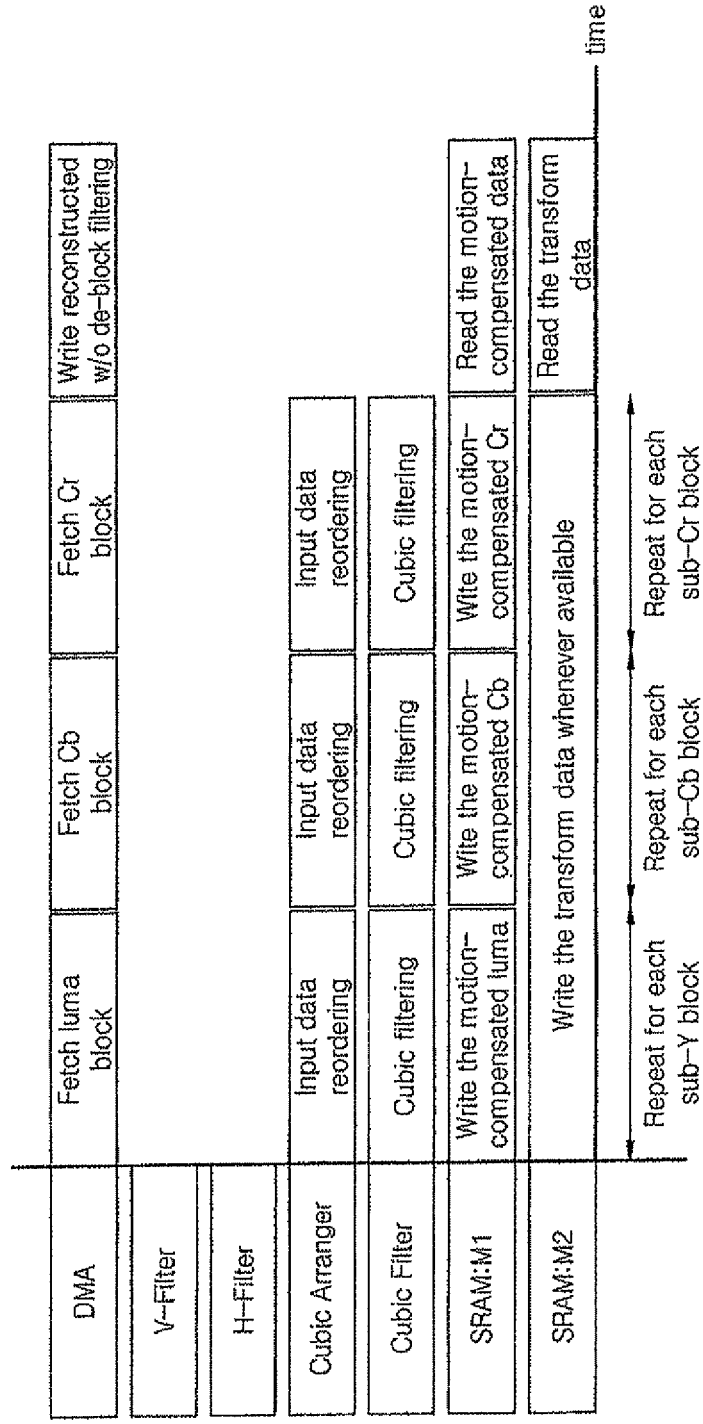
FIG. 7 is a diagram illustrating an operation scenario of a cubic filter according to MPEG4 and VC1 in the apparatus illustrated in FIG. 4.

FIGS. 5 through 7 are diagrams illustrating operation scenarios of each codec in the apparatus of FIG. 4. Referring to FIGS. 5 through 7, since a luminance component of H.264/AVC and VC1 performs linear filtering, horizontal filtering and vertical filtering are performed. In other cases, cubic filtering is performed through a cubic arrangement.

FIG. 5 is a diagram illustrating an operation scenario of a linear filter and cubic filter according to H.264/AVC in the apparatus illustrated in FIG. 4.

Referring to FIG. 5, the apparatus of FIG. 4 performs luminance component filtering of H.264/AVC according to a following operation scenario.

The DMA interface 30 fetches a luminance component of a reference image in block units in a predetermined size from the external memory through the system bus by referring to a motion vector, which indicates a disparity between blocks of the current image and the corresponding blocks of the reference image, from among the MC parameters received from the master interface 20, and outputs the blocks of the fetched luminance component to the vertical filter 41.

When the codec information indicates H.264/AVC, the color information indicates a luminance component, and the filter information indicates a linear filter, the vertical filter 41 calculates a pixel value of a half-pel located between integer-pels in a vertical line from among integer-pels forming a block of the luminance component received from the DMA interface 30 based on pixel values of the integer-pels in the vertical line. Specifically, the vertical filter 41 calculates a pixel value of a half-pel indicated by a motion vector of the block from among the MC parameters received from the master interface 20 by applying the pixel values of the integer-pels in the vertical line on the 6 taps, and outputs the calculated pixel value to the first horizontal filter 42 or the second horizontal filter 43. When the motion vector of the block indicates an integer-pel, the vertical filter 41 outputs the pixel values of the integer-pels forming the block of the luminance component received from the DMA interface 30 to the first or second horizontal filter 42 or 43.

For example, when a location of a pixel indicated by a motion vector is a location h in FIG. 2A, the vertical filter 41 calculates a pixel value of a half-pel in the location h by calculating $h1=(A-5*C+20*G+20*M-5*R+T)$, $h=Clip1Y((h1+16)>>5)$ by applying pixel values of integer-pels in locations A, C, G, M, R, and T on the 6 taps.

When the codec information indicates H.264/AVC, the color information indicates a luminance component, and the filter information indicates a linear filter, the first horizontal filter 42 calculates a pixel value of a half-pel located between integer-pels in a horizontal line from among integer-pels forming a block of the luminance component received from the DMA interface 30 through the vertical filter 41 based on pixel values of the integer-pels. Specifically, the first horizontal filter 42 calculates a pixel value of a half-pel indicated by a motion vector of the block from among the MC parameters received from the master interface 20 by applying the pixel values of the integer-pels in the horizontal line on the 6 taps, and outputs the calculated pixel value to the cubic filter 45. Also, when the motion vector of the block indicates an integer-pel, the first horizontal filter 42 outputs the pixel values of the integer-pels forming the block of the luminance component received from the DMA interface 30 to the cubic filter 45. In addition, the first horizontal filter 42 outputs the pixel value of the half-pel received form the vertical filter 41 to the cubic filter 45.

For example, when a location of a pixel indicated by a motion vector is location b in FIG. 2, the first horizontal filter 42 calculates a pixel value of a half-pel in the location b by calculating $b1=(E-5*F+20*G+20*H-5*I+J)$, $b=Clip1Y((b1+16)>>5)$ by applying pixel values of integer-pels in locations E, F, G, H, I, and J on the 6 taps.

When the codec information indicates H.264/AVC, the color information indicates a luminance component, and the filter information indicates a linear filter, the second horizontal filter 43 calculates a pixel value of a half-pel located between integer-pels or half-pels in another horizontal line from among integer-pels forming a block in the luminance component received from the DMA interface 30 through the vertical filter 41 based on pixel values of the integer-pels or the half-pels in the another horizontal line. Specifically, the second horizontal filter 43 calculates a pixel value of a half-pel indicated by a motion vector of the block from among the MC parameters received from the master interface 20 by applying the pixel values of the integer-pels or half-pels in the another horizontal line on the 6 taps, and outputs the calculated pixel value to the cubic filter 45. Also, when the motion vector of the block indicates an integer-pel, the second horizontal filter outputs pixel values of integer-pels forming the block in the luminance component to the cubic filter 45. In addition, the second horizontal filter 43 outputs the pixel value of the half-pel received form the vertical filter 41 to the cubic filter 45.

For example, when a location of a pixel indicated by a motion vector is a location j in FIG. 2, the second horizontal filter 43 calculates a pixel value of a half-pel in the location j by calculating $j1=cc-5*dd+20*h1+20*m1-5*ee+ff$, $j=Clip1Y((j1+512)>>10)$ by applying pixel values of half-pels in locations cc, dd, h1, m1, ee, and ff on the 6 taps. In order to calculate a pixel value of a quarter-pel, such as $f=(b+j+1)>>1$ in Equation 2, pixel values of two half-pels may be simultaneously required. In this case, the first horizontal filter and the second horizontal filter 43 may be separately included in order to simultaneously process calculating the pixel value of the half-pel in the location b and the pixel value of the half-pel in the location j.

When the codec information indicates H.264/AVC, the color information indicates a luminance component, and the filter information indicates a linear filter, the cubic filter 45 calculates a pixel value of a quarter-pel located between two integer-pels or half-pels in a cubic of a block in a luminance component received from the first and second horizontal filters 42 and 43 based on pixel values of the two integer-pels or half-pels in the cubic. Specifically, the cubic filter 45 calculates a pixel value of a quarter-pel indicated by the motion vector of the block from among the MC parameters received from the master interface by applying the pixel values of the two pixels in the cubic location on two taps corresponding to the cubic location from among the 4 taps, and outputs the calculated pixel value to the first memory 50. Also, the cubic filter 45 outputs the pixel values of the integer-pels or half-pels received from the first or second horizontal filter 42 or 43 to the first memory 50.

For example, when a location of a pixel indicated by a motion vector is a location a in FIG. 2, the cubic filter 45 calculates a pixel value of a quarter-pel in the location a by calculating $a=(G+b+1)>>1$ by applying a pixel value of an integer-pel in the location G and a pixel value of a half-pel in the location b on the two taps corresponding to the cubic locations from among the 4 taps.

Referring to FIG. 5, the apparatus of FIG. 4 performs chrominance component Cb filtering of H.264/AVC according to a following operation scenario.

The DMA interface 30 fetches a chrominance component Cb of the reference image in block units in a predetermined size from the external memory through the system bus by referring to a motion vector, which indicates a disparity between blocks of the current image and corresponding blocks of the reference image, from among the MC parameters received from the master interface 20, and outputs the blocks of the fetched chrominance component Cb to the cubic arranger 44.

When the codec information indicates H.264/AVC, the color information indicates a chrominance component Cb, and the filter information indicates a cubic filter, the cubic arranger 44 arranges four pixel values from among pixel values of integer-pels forming a block in the chrominance component Cb received from the DMA interface 30 on a cubic location required to generate a pixel value of a pixel in a predetermined location indicated by the motion vector received from the master interface 20, and outputs the arranged pixel values of the four integer-pels to the cubic filter 45.

When the codec information indicates H.264/AVC, the color information indicates a chrominance component Cb, and the filter information indicates a cubic filter, the cubic filter 45 calculates a pixel value of a pixel in a predetermined location between the arranged pixels based on the pixel values of the four integer-pels arranged by the cubic arranger 44 as illustrated in FIG. 3. Specifically, the cubic filter calculates a pixel value of a quarter-pel indicated by the motion vector of the block from among the MC parameters received from the master interface 20 by applying the pixel values of the four pixels in the cubic location on the four taps in the corresponding cubic location, and outputs the calculated pixel value to the first memory 50.

For example, when a location of a pixel indicated by a motion vector is a convergence point of four arrows illustrated in FIG. 2B, the cubic filter 45 calculates a pixel value of a pixel in the predetermined location by calculating $P=((8-xFrc)*(8-yFrc)*P1+xFrc*(8-yFrc)*P2+(8-xFrc)*yFrc*P3+xFrc*yFrc*P4+32)>>6$ by applying pixel values of integer-pels in P1, P2, P3, and P4 on the four taps.

Referring to FIG. 5, the DMA interface 30, the cubic arranger 44, and the cubic filter 45 operate in the same manner for a chrominance component Cr as the operation scenario for the chrominance component Cb. Accordingly, detailed description about an operation scenario of a chrominance component Cr filtering of H.264/AVC will be omitted herein.

FIG. 6 is a diagram illustrating an operation scenario of a linear filter according to VC1 in the apparatus illustrated in FIG. 4.

Referring to FIG. 6, the apparatus of FIG. 4 performs luminance component filtering of VC1 according to a following operation scenario.

The DMA interface 30 fetches a luminance component of a reference image in block units in a predetermined size from the external memory through the system bus by referring to a motion vector, which indicates disparity between blocks of a current image and corresponding blocks of the reference image, from among MC parameters received from the master interface 20, and outputs the blocks of the fetched luminance component to the vertical filter 41.

When the codec information indicates V1, the color information indicates a luminance component, and the filter information indicates a linear filter, the vertical filter 41 calculates a pixel value of a half-pel or a quarter-pel located between integer-pels in a vertical line from among integer-pels forming the block of the luminance component received from the DMA interface 30 based on pixel values of the integer-pels in the vertical line. Specifically, the vertical filter 41 calculates a pixel value of a half-pel or a quarter-pel indicated by a motion vector of the block from among the MC parameters received from the master interface 20 by applying the pixel values of the integer-pels in the vertical line on the four taps, and outputs the calculated pixel value to the first horizontal filter 42. The vertical filter 41 can calculate the pixel value of the half-pel or the quarter-pel by adjusting coefficient values of a 4-tap filter. Also, when the motion vector of the block indicates an integer-pel, the vertical filter 41 outputs the pixel values of the integer-pels forming the block of the luminance component received from the DMA interface 30 to the first horizontal filter 42.

In the embodiment of FIG. 5, 6-tap filters are used as the vertical filter 41 and the first horizontal filter 42. Since the 6-tap filter can be used as a 4-tap filter, without changing a hardware structure, by not using 2 taps from among 6 taps, the 6-tap filter of FIG. 5 can be used as a 4-tap filter for the vertical filter 41 and the first horizontal filter 42 in FIG. 6.

When the codec information indicates V1, the color information indicates a luminance component, and the filter information indicates a linear filter, the first horizontal filter 42 calculates a pixel value of a half-pel or a quarter-pel located between integer-pels in a horizontal line from among integer-pels forming the block of the luminance component received from the DMA interface 30 through the vertical filter 41 based on pixel values of the integer-pels in the horizontal line. Specifically, the first horizontal filter 42 calculates a pixel value of a half-pel or a quarter-pel indicated by a motion vector of the block from among the MC parameters received from the master interface 20 by applying the pixel values of the integer-pels in the horizontal line on the 4 taps, and outputs the calculated pixel value to the cubic filter 45. Also, when the motion vector indicates an integer-pel, the first horizontal filter 42 outputs the pixel values of the integer-pels forming the block of the luminance component received form the DMA interface 30 through the vertical filter 41 to the first memory 50. Also, the first horizontal filter 42 outputs the pixel values of the half-pel or the quarter-pel received from the vertical filter 41 to the first memory 50.

For example, when locations of pixels indicated by the motion vector are black points in FIG. 2C, the first horizontal filter 42 calculates pixel values of half-pels or quarter-pels corresponding ot the block points by calculating $P=(a*P1+b*P2+c*P3+d*P4+rc)>>s$ by applying pixel values of integer-pels in P1, P2, P3, and P4 on the four taps. Although a detailed example of the vertical filter 41 is not illustrated, the horizontal filtering is only changed to the vertical filtering, and thus the vertical filtering is performed as described above. Also, referring to FIG. 6, the DMA interface 30, the vertical filter 41, and the second horizontal filter 43 operate in the same manner as the operation scenario of the luminance component for chrominance components Cb and Cr.

In the process of compensating motion of the luminance component of the reference image as the linear filter of VC1, two horizontal filters are not required to be used simultaneously, and thus any one of the horizontal filters may be used. Specifically in the current embodiment, the first horizontal filter 42 is used from among the first and second horizontal filters 42 and 43, but it is well known to ordinary skill in the art that the second horizontal filter 43 can also be used.

FIG. 7 is a diagram illustrating an operation scenario of a cubic filter according to MPEG4 and VC1 in the apparatus illustrated in FIG. 4.

Referring to FIG. 7, the apparatus of FIG. 4 performs luminance component filtering of MPEG4 and VC1 according to a following operation scenario.

The DMA interface 30 fetches a luminance component of the reference image from the external memory through the system bus in block units in a predetermined size by referring to the motion vector, which indicates a disparity between the blocks of the current image and the corresponding blocks of the reference image, from among MC parameters received from the master interface 20, and outputs the blocks in the fetched luminance component to the cubic arranger 44.

When the codec information indicates MPEG4 or VC1, the color information indicates a luminance component, and the filter information indicates a cubic filter, the cubic arranger 44 arranges four pixel values of integer-pels from among integer-pels forming the block in the luminance component received from the DMA interface 30 on a cubic location required to generate a pixel value of a half-pel or a pixel in a predetermined location indicated by the motion vector received from the master interface 20, and outputs the four arranged pixel values of the integer-pels to the cubic filter 45.

When the codec information indicates MPEG4 or VC1, the color information indicates a luminance component, and the filter information indicates a cubic filter, the cubic filter 45 calculates a pixel value of a half-pel or a pixel in the predetermined location between the four integer-pels arranged by the cubic arranger 44 as illustrated in FIG. 3 based on the pixel values of the four arranged integer-pels. Specifically, the cubic filter 45 calculates a pixel value of a half-pel or a pixel in the predetermined location indicated by the motion vector of the block from among the MC parameters received from the master interface 20 by applying the four pixel values of the integer-pels in the cubic location on the corresponding four taps, and outputs the calculated pixel value to the first memory 50.

For example, when locations of pixels indicated by the motion vector are black points illustrated in FIG. 2D, the cubic filter 45 calculates pixel values of the pixels corresponding to the black points by calculating $P=(P1+P2+1-rc)>>1$, $P=(P1+P3+1-rc)>>1$, $P=(P1+P2+P3+P4-rc)>>1$ by applying pixel values of integer-pels in P1, P2, P3, and P4 on the 4 taps. Also, when locations of pixels indicated by the motion vector are convergence points of four arrows illustrated in FIG. 2E, the cubic filter calculates pixel values of pixels in the predetermined location by calculating $P=(a*P1+b*P2+c*P3+d*P4+rc)>>s$ by applying pixel values of integer-pels in P1, P2, P3, and P4 on the 4 taps.

Referring to FIG. 7, the DMA interface 30, the cubic arranger 44, and the cubic filter 45 operate in the same manner as the operation scenario of the luminance component for chrominance components Cb and Cr.

Specifically, the current embodiment employs a register array form. When the horizontal filtering by the first or second horizontal filter 42 or 43 and the vertical filtering by the vertical filter 41 have to be performed, a result value of the horizontal filtering may be used in the vertical filtering, or a result value of the vertical filtering may be used in the horizontal filtering.

Figure 8:
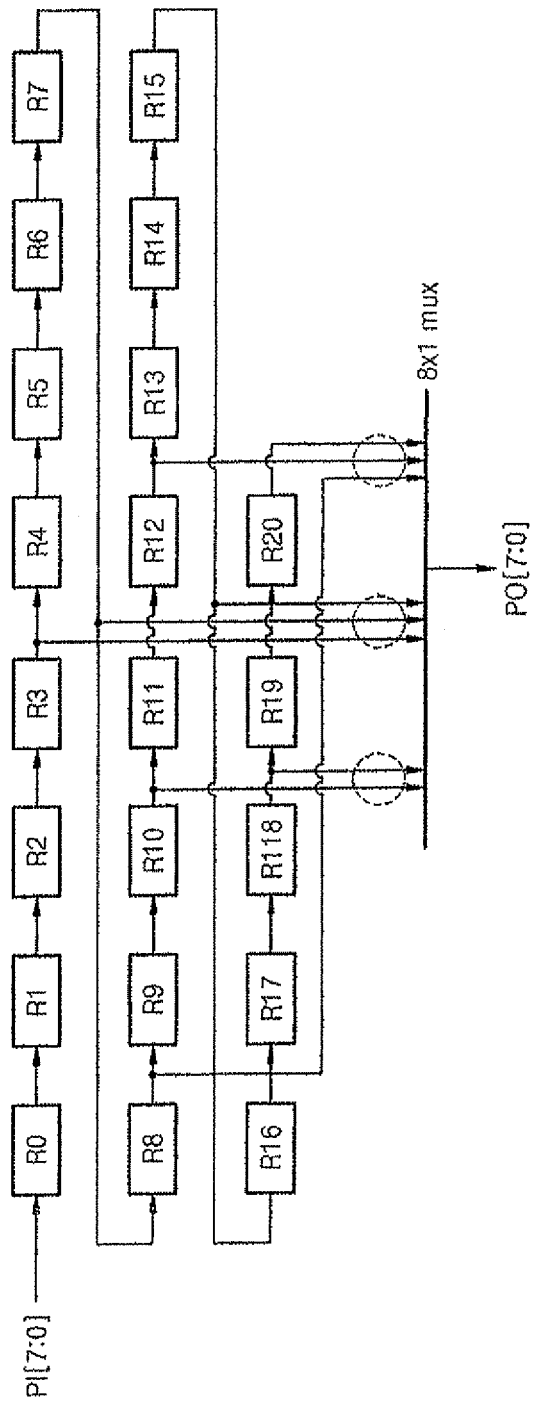
FIG. 8 is a diagram illustrating a register array chain inside a vertical filter illustrated in FIG. 4.

FIG. 8 is a diagram illustrating a register array chain inside the vertical filter 41 illustrated in FIG. 4.

Referring to FIG. 8, the register array chain inside the vertical filter 41 is formed of 21 8-bit registers, considering that the number of pixels forming one line of a block is 21 in case of H.264/AVC. In case of other codecs excluding H.264/AVC, the number of pixels forming one line of a block is below 21. Specifically, since H.264/AVC uses a 6-tap filter, 5 such register array chains are required, and they are connected in series. An output value of one register array chain becomes an input value of another connected register array chain.

The register array chain inside the vertical filter 41 receives a pixel value of a pixel corresponding to 8-bit at each clock from the DMA interface 30, and stores the received pixel value in a register R0 while shifting a pixel value currently stored in each of the 21 registers by one to the right, and accordingly lets out a pixel value stored in a register R20.

Specifically, when a location of a pixel indicated by a motion vector of each H.264/AVC and VC1 is an integer-pel, the register array chain outputs any one of a pixel value stored in a resister R3, a pixel value stored in a register R7, and a pixel value stored in a register R15 according to the size of the block through a 8×1 MUX at each clock. For example, when motion compensation is performed in a 4×4 block unit by the motion compensation engine 40, the register array chain outputs the pixel value stored in the register R3, when motion compensation is performed in a 8×8 block unit, the register array chain outputs the pixel value stored in the register R7, and when motion compensation is performed in a 16×16 block unit, the register array chain outputs the pixel value stored in the register R15.

When a location of a pixel indicated by the motion vector of H.264/AVC is not an integer-pel, the register array chain outputs any one of a pixel value stored in a register R8, a pixel value stored in a register R12, and a pixel value stored in the register R20 according to the size of the block. For example, when motion compensation is performed in a 4×4 block unit by the motion compensation engine 40, the register array chain outputs the pixel value stored in the register R8, when motion compensation is performed in a 8×8 block unit, the register array chain outputs the pixel value stored in the register 12, and when motion compensation is performed in a 16×16 block unit, the register array chain outputs the pixel value stored in the register 20.

When a location of a pixel indicated by the motion vector is not an integer-pel in VC1, the register array chain outputs any one of a pixel value stored in a register R10 and a pixel value stored in a register R18 according to the size of the block. For example, when motion compensation is performed in a 8×8 block unit by the motion compensation engine 40, the register array chain outputs the pixel value stored in the register R10 and when motion compensation is performed in a 16×16 block unit, the register array chain outputs the pixel value stored in the register 20. In case of VC1, a 4×4 block mode is not supported.

Figure 9:
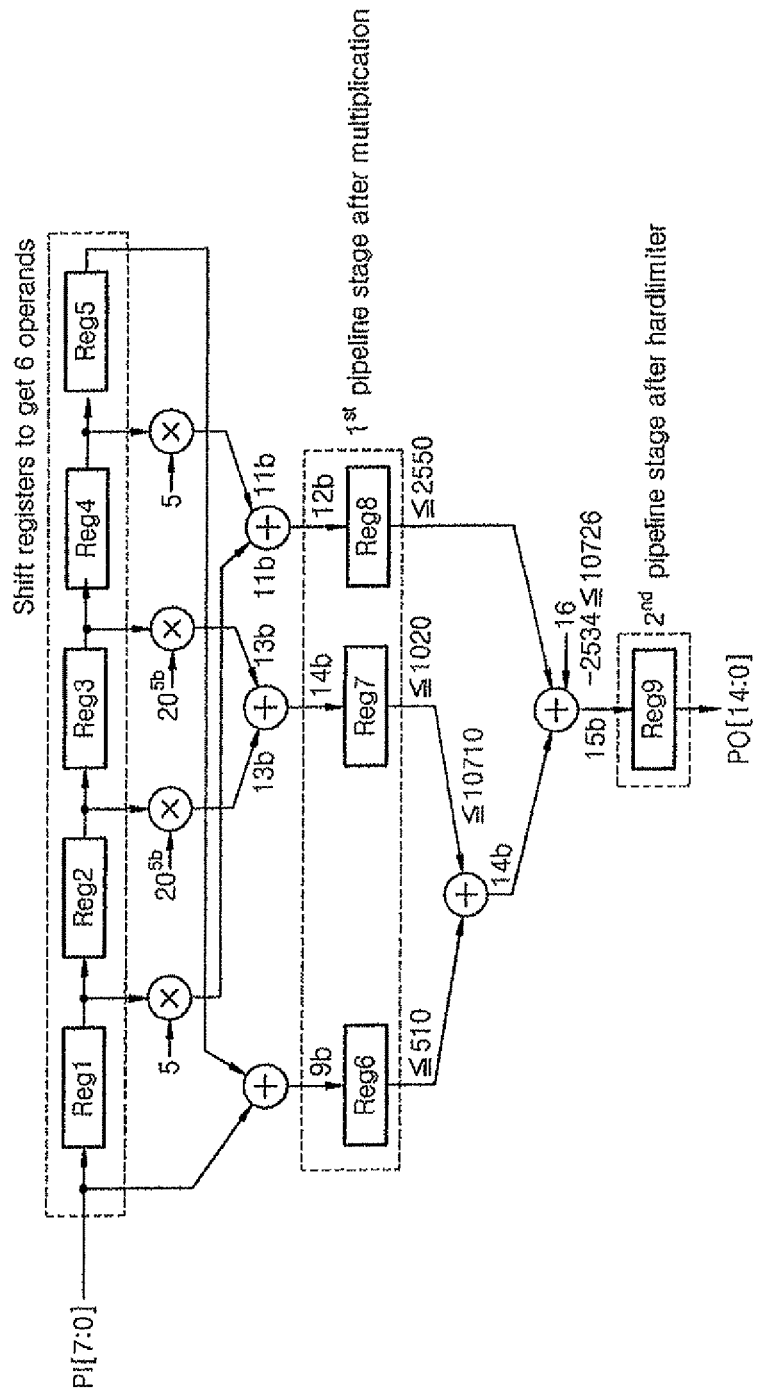
FIG. 9 is a diagram illustrating a 6-tap filter inside a vertical filter illustrated in FIG. 4.

FIG. 9 is a diagram illustrating a 6-tap filter inside the vertical filter 41 illustrated in FIG. 4.

Referring to FIG. 9, the 6-tap filter inside the vertical filter 41 receives output values of the register array chain illustrated in FIG. 8. In other words, the 6-tap filter calculates pixel values of half-pels located between six pixels, which are outputted and accumulated during 6 clocks from the register array chain, i.e. pixel values of 5 integer-pels stored in registers R1 through R5 and a pixel value currently inputted, based on pixel values of the six pixels. Since output values of one register array chain are stored in one register of the 6-tap filter, 5 register array chains are required correspondingly to the 5 registers of the 6-tap filter. In other words, the 6-tap filter illustrated in FIG. 9 includes 9 registers, 5 multipliers, and 5 adders in order to calculate Equation 1, for example, b1=(E−5*F+20*G+20*H−5*I+J). Referring to FIG. 9, two input terminals of the rightmost adders and each input terminals of the 4 multipliers correspond to 6 taps.

Figure 10:
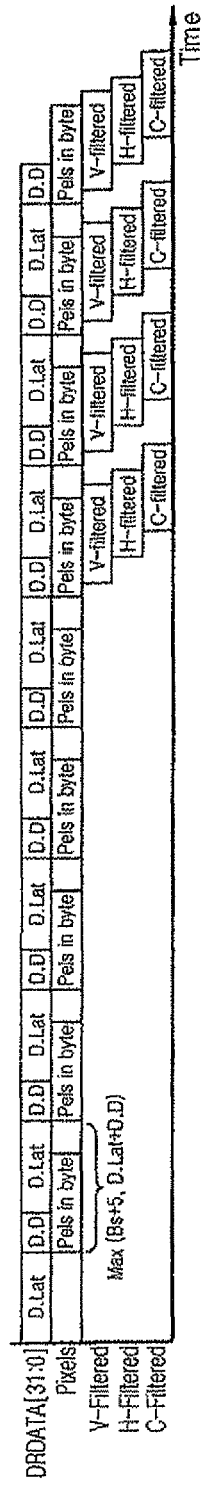
FIG. 10 is a timing diagram about data process in the apparatus illustrated in FIG. 4.

FIG. 10 is a timing diagram about data process in the apparatus illustrated in FIG. 4.

Referring to FIG. 10, the DMA interface 30, the vertical filter 41, the first horizontal filter 42, the second horizontal filter 43, and the cubic filter 45 operate in a pipeline form during a data latency period, which is a stand-by period for receiving data in a 32-bit after requesting for the data corresponding to the reference image to the external memory, and a data delivery period, which is a period for receiving the data from the external memory. Generally, since the data latency period and the data delivery period are very long, filtering operations of the vertical filter 41, the first horizontal filter 42, the second horizontal filter 43, and the cubic filter 45 are performed hidden in the periods. Accordingly, motion compensation can be performed quickly.

Figure 11:
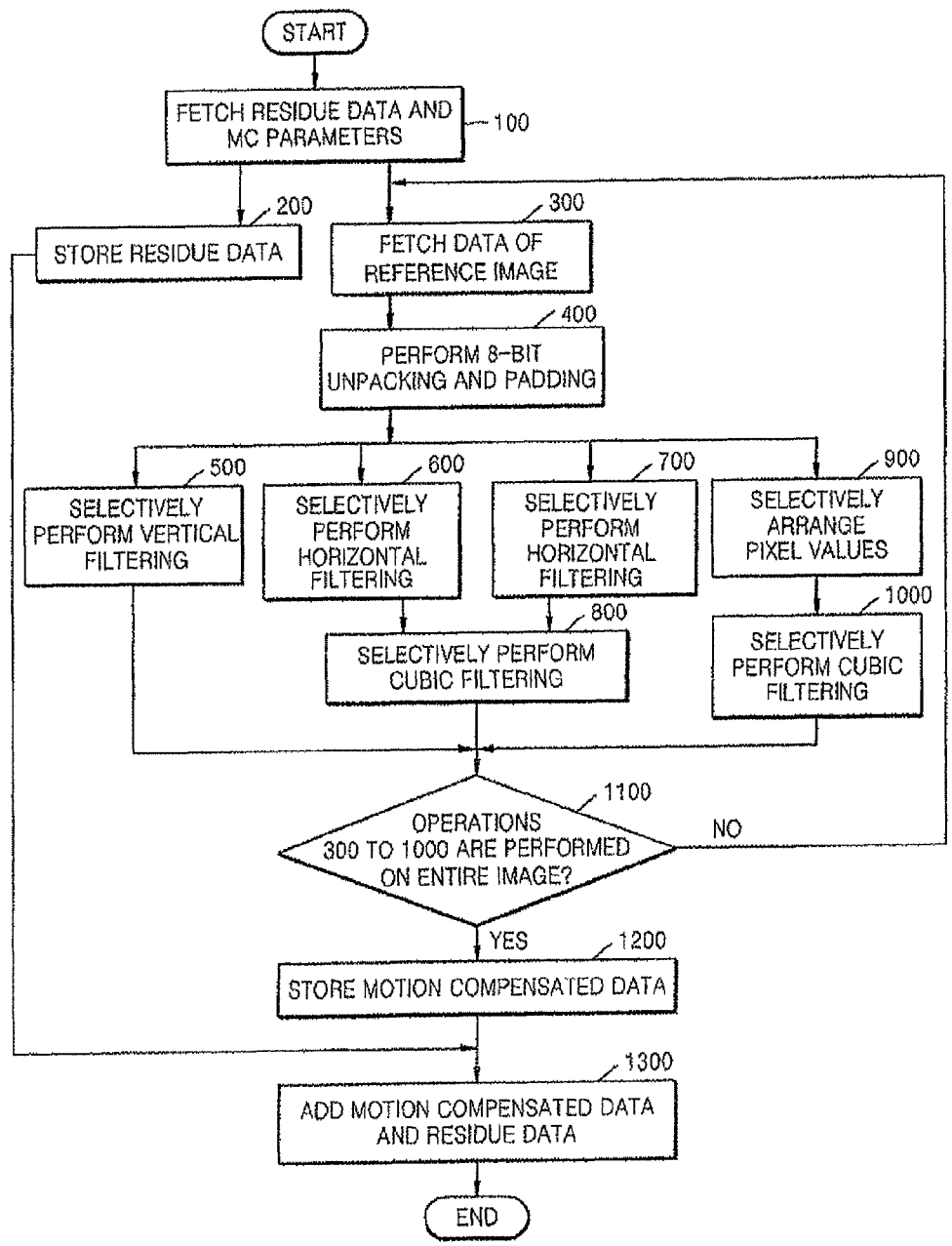
FIG. 11 is a flowchart illustrating a method for motion compensation supporting multicodec according to an embodiment of the present invention.

FIG. 11 is a flowchart illustrating a method for motion compensation supporting multicodec according to an embodiment of the present invention.

Referring to FIG. 11, the method according to the current embodiment of the present invention is formed of operations processed time serially in the apparatus illustrated in FIG. 4. Accordingly, even if there is an omitted description, the detailed description of the apparatus applies the same to the method of FIG. 11.

In operation 100, an apparatus for motion compensation supporting multicodec according to the present invention fetches residue data, which corresponds to a difference between a reference image and a current image, and MC parameters, which are parameters required for motion compensation, from an external encoding apparatus through a system bus.

In operation 200, the apparatus stores the fetched residue data.

In operation 300, the apparatus fetches data in a 32-bit unit of the reference image, which is shared by the reference image and the current image, from an external memory through the system bus by referring to a motion vector, which indicates a disparity between blocks of the current image and corresponding blocks of the reference image, from among the MC parameters fetched in operation 100.

In operation 400, the apparatus the apparatus performs 8-bit unpacking and padding according to the motion vector on the data in a 32-bit unit fetched in operation 300.

In operation 500, the apparatus selectively calculates a pixel value of a half-pel located between integer-pels in a vertical line of a block of the reference image corresponding to the result of operation 400 based on pixel value of the integer-pels in the vertical line according to codec information, which indicates any one of a plurality of codecs, color information, which indicates any one of a plurality of color components, and filter information, which indicates any one of a plurality of filters, from among the MC parameters fetched in operation 100.

In detail, when the codec information indicates H.264/AVC, the color information indicates a luminance component, and the filter information indicates a linear filter, or when the codec information indicates VC1, the color information indicates a luminance component or a chrominance component, and the filter information indicates a linear filter, the apparatus calculates a pixel value of a half-pel located between integer-pels in a vertical line of a block of the reference image corresponding to the result of operation 400 based on pixel values of the integer-pels in the vertical line in operation 500. In other cases, the vertical filtering of operation 500 is not performed.

In operation 600, the apparatus selectively calculates a pixel value of a half-pel or a quarter-pel located between integer-pels in a horizontal line of a block of the reference image corresponding to the result of operation 400 based on pixel values of the integer-pels in the horizontal line according to the codec information, the color information, and the filter information from among the MC parameters fetched in operation 100.

In detail, when the codec information indicates H.264/AVC, the color information indicates a luminance component, the filter information indicates a linear filter, or when the codec information indicates VC1, the color information indicates a luminance component or a chrominance component, and the filter information indicates a linear filter, the apparatus calculates a pixel value of a half-pel or a quarter-pel located between integer-pels in a horizontal line of a block of the reference image corresponding to the result of operation 400 based on pixel values of the integer-pels in the horizontal line in operation 600. In other cases, the horizontal filtering of operation 600 is not performed.

In operation 700, the apparatus selectively calculates a pixel value of a half-pel located between integer-pels or half-pels in another horizontal line, different from the horizontal line of operation 600, based on pixel values of the integer-pels or the half-pels in the another horizontal line according to the codec information, the color information, and the filter information from among the MC parameters fetched in operation 100.

In detail, when the codec information indicates H.264/AVC, the color information indicates a luminance component, and the filter information indicates a linear filter, the apparatus calculates a pixel value of a half-pel located between integer-pels or half-pels in another horizontal line, different from the horizontal line of operation 600, based on pixel values of the integer-pels or half-pels in the another horizontal line in operation 700. In other cases, the horizontal filtering of operation 700 is not performed.

In operation 800, the apparatus selectively calculates a pixel value of a quarter-pel located between two integer-pels or the half-pels calculated in operations 600 and 700 in a cubic of a block in a luminance component based on pixel values of the two integer-pels or half-pels according to the codec information, the color information, and the filter information from among MC parameters fetched in operation 100.

In detail, when the codec information indicates H.264/AVC, the color information indicates a luminance component, and the filter information indicates a linear filter, the apparatus calculates a pixel value of a quarter-pel located between two integer-pels or the half-pels calculated in operations 600 and 700 in a cubic of a block in a luminance component based on pixel values of the two integer-pels or half-pels. In other cases, the cubic filtering of operation 800 is not performed.

In operation 900, the apparatus selectively arranges the pixel values of the integer-pels corresponding to the result of operation 400 in a cubic location required to generate a pixel value of a half-pel, a quarter-pel, or a pixel in a predetermined location directed by a motion vector of the block according to the codec information, the color information, and the filter information from among MC parameters fetched in operation 100.

In detail, when the codec information indicates H.264/AVC, the color information indicates a chrominance component, and the filter information indicates a cubic filter, when the codec information indicates MPEG4, the color information indicates a luminance component or a chrominance component, and the filter information indicates a cubic filter, or when the codec information indicates VC1, the color information indicates a luminance component or a chrominance component, and the filter information indicates a cubic filter, the apparatus arranges the pixel values of the integer-pels corresponding to the result of operation 400 in a cubic location required to generate a pixel value of a half-pel, a quarter-pel, or a pixel in a predetermined location directed by a motion vector of the block in operation 900. In other cases, the cubic arrangement of operation 900 is not performed.

In operation 1000, the apparatus calucaltes a pixel value of a half-pel, a quarter-pel, or a pixel in a predetermined location between four integer-pels arranged in operation 900 as illustrated in FIG. 3 based on pixel values of the arranged four integer-pels.

In operation 1100, the apparatus determines whether operations 300 through 1000 are performed on the entire reference image, and when it is determined that operations 300 through 1000 are performed on the entire reference image, operation 1200 is performed and when it is determined that operations 300 through 1000 are not performed on the entire reference image, operation 300 is performed.

In operation 1200, the apparatus stores motion compensation data generated through operations 300 through 1000.

In operation 1300, the apparatus restores the current image by adding the motion compensation data stored in operation 1200 and the residue data stored in operation 200.

As described above, the size of a chip can be minimized while realizing motion compensation supporting multicodec in hardware by selectively performing common portions, such as vertical filtering, horizontal filtering, and cubic filtering, of a plurality of codecs, such as MPEG4, H.264/AVC, and VC1 according to codec information, which indicates any one of the plurality of codecs. Specifically, the motion compensation can be easily realized in hardware by modularizing the motion compensation so that the common portion can be selectively performed. Moreover, as the number of parts used in the chip reduces, manufacturing expenses of the chip also decreases.

Also, according to the present embodiment, the vertical filtering, the horizontal filtering, and the cubic filtering are performed in a pipeline form during a stand-by period for receiving data from an external memory and a period for receiving the data from the external memory, and thus time consumed for processing the motion compensation can be minimized. Accordingly, an image can be encoded and decoded in real-time while supporting multicodec, and thus an apparatus, such as a DMB reproducing apparatus, which supports multicodec can be easily manufactured.

The embodiments of the present invention can be written as computer programs and can be implemented in general-use digital computers that execute the programs using a computer readable recording medium. Also, a structure of the data used in the embodiments of the present invention can be recorded on a computer readable recording medium through various means. Examples of the computer readable recording medium include magnetic storage media (e.g., ROM, floppy disks, hard disks, etc.), optical recording media (e.g., CD-ROMs, or DVDs), and storage media such as carrier waves (e.g., transmission through the Internet).

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method for motion compensation, comprising:
    calculating a pixel value of a pixel located between pixels of a reference image corresponding to a current image, based on pixel values of the pixels of the reference image by using at least one method from among a plurality of methods of interpolating the pixels of the reference image; and
    restoring the current image by adding motion compensation data, including the calculated pixel value, and a difference between the reference image and the current image,
    wherein the at least one method from among the plurality of methods is selected according to codec information, indicating one of a plurality of codecs, the codec information being received from an external encoding apparatus.

2. A method for motion compensation, comprising:
    calculating a pixel value of a pixel located between pixels of a reference image corresponding to a current image, based on pixel values of the pixels of the reference image by using at least one method from among a plurality of methods of interpolating the pixels of the reference image; and restoring the current image by adding motion compensation data, including the calculated pixel value, and a difference between the reference image and the current image, wherein the at least one method from among the plurality of methods is selected according to codec information, indicating one of a plurality of codecs, the codec information being received from an external encoding apparatus, wherein the calculating of the pixel value comprises:

(a1) selectively calculating a pixel value of a pixel located between pixels in a vertical line of a block of the reference image based on values of the pixels in the vertical line according to the codec information;

(a2) selectively calculating a pixel value of a pixel located between pixels in a horizontal line of the block based on values of the pixels in the horizontal line according to the codec information; and (a3) selectively calculating a pixel value of a pixel located between pixels in a cubic of the block based on values of the pixels in the cubic according to the codec information.

3. The method of claim 2, wherein each of (a1), (a2), and (a3) selectively calculates the pixel value of the pixel according to the codec information and color information indicating one of a plurality of color components.

4. The method of claim 3, wherein when the codec information indicates H.264/AVC and the color information indicates a luminance component, each of (a1), (a2), and (a3) calculates the pixel value.

5. The method of claim 4, wherein (a1) calculates the pixel value by applying the pixel values of the pixels in the vertical line on 6 taps, (a2) calculates the pixel value by applying the pixel values of the pixels in the horizontal line on 6 taps, and (a3) calculates the pixel value by applying the pixel values of two pixels in the cubic on 2 taps from among 4 taps.

6. The method of claim 3, wherein when the codec information indicates H.264/AVC and the color information indicates a chrominance component, (a1) and (a2) do not calculate the pixel value, and (a3) calculates the pixel value.

7. The method of claim 3, wherein each of (a1), (a2), and (a3) selectively calculates the pixel value according to the codec information, the color information, and filter information indicating one of a plurality of filters.

8. The method of claim 7, wherein when the codec information indicates VC1, the color information indicates a luminance component or a chrominance component, and the filter information indicates a linear filter, (a1) and (a2) calculate the pixel value, and (a3) does not calculate the pixel value.

9. The method of claim 7, wherein when the codec information indicates VC1, the color information indicates a luminance component or a chrominance component, and the filter information indicates a cubic filter, (a1) and (a2) do not calculate the pixel value, and (a3) calculates the pixel value.

10. The method of claim 1, wherein the calculating of the pixel value further comprises calculating the pixel value indicated by a motion vector of a block of the reference image.

11. The method of claim 2, further comprising selectively calculating a pixel value of a pixel located between pixels in another horizontal line, which is different from the horizontal line, based on pixel values of the pixels in the another horizontal line according to the codec information.

12. The method of claim 2, further comprising:

selectively arranging the pixel values of the pixels in a cubic location required to generate a pixel value of a pixel indicated by a motion vector of the block according to the codec information; and selectively calculating a pixel value of a pixel located between the arranged pixels based on the arranged pixel values according to the codec information.

13. The method of claim 2, wherein (a1) calculates a pixel value of a half-pel located between the pixels in the vertical line based on pixel values of integer-pels in the vertical line, (a2) calculates a pixel value of a half-pel located between the pixels of the horizontal line based on pixel values of integer-pels in the horizontal line, and (a3) calculates a pixel value of a quarter-pel located between the pixels in the cubic based on a pixel value of an integer-pel forming the block, the pixel value of the half-pel calculated in (a1) and the pixel value of the half-pel calculated in (a2).

14. The method of claim 1, further comprising selectively outputting pixel values stored in registers in a predetermined location from among a plurality of registers according to a location of a pixel indicated by a motion vector of each codec, wherein the calculating of the pixel value further comprises calculating a pixel value of a pixel located between pixels, which are outputted and accumulated during a predetermined number of clocks, based on pixel values of the pixels.

15. The method of claim 14, wherein any one of registers from among the registers in the predetermined location is outputted according to the size of the block.

16. The method of claim 2, wherein each of (a1), (a2), and (a3) are performed in a pipeline form in a section for standing by in order to receive data corresponding to the current image from an external memory and in a section for receiving the data from the external memory.

17. A non-transitory computer readable recording medium having recorded thereon a program for executing a method for motion compensation, the method comprising:

calculating a pixel value of a pixel located between pixels of a reference image corresponding to a current image based on pixel values of the pixels of the reference image by using at least one method from among a plurality of methods of complementing the pixels of the reference image; and restoring the current image by adding motion compensation data, including the calculated pixel value, and a difference between the reference image and the current image, wherein the at least one method from among the plurality of methods is selected according to codec information, indicating one of a plurality of codecs, the codec information being received from an external encoding apparatus.

18. An apparatus for motion compensation, comprising:

a motion compensation engine to calculate a pixel value of a pixel located between pixels of a reference image corresponding to a current image based on pixel values of the pixels of the reference image by using at least one method from among a plurality of methods of interpolating the pixels of the reference image; and an adder to restore the current image by adding motion compensation data, including the calculated pixel value, and a difference between the reference image and the current image, wherein the at least one method from among the plurality of methods is selected according to codec information, indicating one of a plurality of codecs, the codec information being received from an external encoding apparatus.

19. An apparatus for motion compensation, comprising:

a motion compensation engine, which calculates a pixel value of a pixel located between pixels of a reference image corresponding to a current image based on pixel values of the pixels of the reference image by using at least one method from among a plurality of methods of interpolating the pixels of the reference image; and an adder, which restores the current image by adding motion compensation data, including the calculated pixel value, and a difference between the reference image and the current image, wherein the at least one method from among the plurality of methods is selected according to codec information, indicating one of a plurality of codecs, the codec information being received from an external encoding apparatus, wherein the motion compensation engine comprises:

a vertical filter to selectively calculate a pixel value of a pixel located between pixels in a vertical line of a block of the reference image based on values of the pixels in the vertical line according to the codec information;

a horizontal filter to selectively calculate a pixel value of a pixel located between pixels in a horizontal line of the block based on values of the pixels in the horizontal line according to the codec information; and a cubic filter to selectively calculate a pixel value of a pixel located between pixels in a cubic of the block based on values of the pixels in the cubic according to the codec information.

* * * * *